(12) United States Patent
Andreasen

(10) Patent No.: US 9,161,578 B1
(45) Date of Patent: Oct. 20, 2015

(54) FINGER GUARD ASSEMBLIES

(71) Applicant: George Andreasen, Santa Barbara, CA (US)

(72) Inventor: George Andreasen, Santa Barbara, CA (US)

(73) Assignee: George Andreasen, Santa Barbara, CA (US)

( * ) Notice: Subject to any disclaimer, the term of this patent is extended or adjusted under 35 U.S.C. 154(b) by 0 days.

(21) Appl. No.: 14/508,466

(22) Filed: Oct. 7, 2014

(51) Int. Cl.
*G01B 3/10* (2006.01)
*A41D 13/08* (2006.01)

(52) U.S. Cl.
CPC ............ *A41D 13/087* (2013.01); *G01B 3/1084* (2013.01); *G01B 2003/1089* (2013.01)

(58) Field of Classification Search
CPC ............................................. G01B 2003/1089
USPC ..................... 33/770, 42, 41.1, 759, 760, 768
See application file for complete search history.

(56) References Cited

U.S. PATENT DOCUMENTS

| | | | | |
|---|---|---|---|---|
| 848,387 A * | 3/1907 | Nielsen | ............................ | 33/486 |
| 1,046,975 A * | 12/1912 | Clark, Jr. | ............................ | 33/42 |
| 2,588,658 A * | 3/1952 | Plotnik | ............................ | 33/42 |
| 3,192,630 A * | 7/1965 | Dineson | ............................ | 33/42 |
| 4,200,984 A * | 5/1980 | Fink | ............................ | 33/427 |
| 5,189,801 A * | 3/1993 | Nicely | ............................ | 33/42 |
| 5,842,284 A | 12/1998 | Goldman | | |
| 6,038,697 A | 3/2000 | Kasarnich | | |
| 6,523,272 B1 * | 2/2003 | Morales | ......................... | 33/526 |
| 7,254,855 B2 | 8/2007 | McCreesh | | |
| 7,260,898 B2 | 8/2007 | Snelson | | |
| 7,647,705 B2 | 1/2010 | Rosso et al. | | |
| 8,020,312 B1 | 9/2011 | McGahan | | |
| 8,272,136 B2 | 9/2012 | Vogeler et al. | | |
| 8,806,770 B2 * | 8/2014 | Steele et al. | .................... | 33/768 |
| 2003/0019116 A1 | 1/2003 | DeWall | | |
| 2004/0025364 A1 * | 2/2004 | Elder et al. | ....................... | 33/770 |
| 2008/0196264 A1 * | 8/2008 | McEwan et al. | ................ | 33/758 |
| 2009/0090017 A1 * | 4/2009 | Smiroldo | ........................ | 33/770 |
| 2011/0162220 A1 | 7/2011 | Vogeler et al. | | |
| 2012/0240419 A1 * | 9/2012 | Wagner | ....................... | 33/275 R |

* cited by examiner

*Primary Examiner* — Christopher Fulton
(74) *Attorney, Agent, or Firm* — Foley and Lardner LLP; John D. Lanza

(57) ABSTRACT

Finger guard assemblies and methods of manufacturing finger guard assemblies are provided. The finger guard assembly includes a finger guard housing and a finger guard component including a shroud portion and an engagement arm slidably coupled to the finger guard housing.

17 Claims, 10 Drawing Sheets

FINGER GUARD ASSEMBLIES

TECHNICAL FIELD

The present disclosure relates to cutting guards.

BACKGROUND

Installing materials such as dry wall in a location typically includes making a number of measurements and cutting the dry wall to fit into a location based on the measurements made. Movement during the measurement phase and the cutting phase may be frequent in significant drywall installation jobs. While a marking device may be used to mark a desired measurement and a tool such as razor blade or other sharp object may be used to cut the drywall, the drywall may also be cut on an initial pass without marking to increase speed. Simultaneously cutting and measuring the drywall is facilitated by sliding an extending tape measure along the drywall while cutting. Specifically, when an installer is cutting the dry wall at a measured distance, the dry wall installer may be holding the tape measure in place in one hand and may be cutting or making the measured line with the opposing hand. During such an operation the drywall installer pinches the tape measure at the desired extended length with one hand. The fingers pinching the tape measure at the desired extended length slide along an edge of the drywall as the cutting tool slides with the front end of the measuring tape on a surface of the drywall to cut the drywall to the desired length. The edge of the drywall along which the pinched measuring tape slides may be uncut and papered or may be previously cut, having an exposed abrasive edge. In either case, pressure applied from holding the tape measure at the desired length while sliding the tape to cut and/or mark the drywall results in the pinched fingers being rubbed against the drywall edge. The rubbing may cause finger cuts to occur as the pinching fingers traverse or pass against the side of the drywall or other material being measured and/or cut, particularly upon repeated passes along the material edge.

SUMMARY

Various embodiments disclosed herein provide a finger guard assembly including a finger guard housing having a plurality of housing walls. At least one of the housing walls in the plurality of housing walls includes an opening. The plurality of housing walls form an engagement slot extending from the opening into the finger guard housing. The finger guard assembly also includes a finger guard component including a shroud portion and an engagement arm extending from the shroud portion. The engagement arm is positioned in the engagement slot and thereby slidably coupled to the finger guard housing so that a distance between the shroud portion and the plurality of housing walls is variable.

In particular embodiments, the shroud portion includes a curved face. The shroud portion may include a curved back positioned opposite the curved face. The engagement arm includes a first lateral locking tab extending from a first side of the engagement arm and a second lateral locking tab extending from a second side of the engagement arm in accordance with particular embodiments. The second side is opposite the first side. In particular embodiments, the first lateral locking tab extends from a first flexure of the engagement arms positioned on the first side and the second lateral locking tab extends from a second flexure of the engagement arm positioned on the second side. The engagement arm includes a first slot spacing the first flexure from a portion of the engagement arm and a second slot spacing the second flexure from a portion of the engagement arm, in accordance with particular embodiments. The portion is positioned between the first lateral locking tab and the second lateral locking tab. The lateral distance between the first locking tab and the second locking tab may be wider than a lateral width of the opening. The housing may include a curved recess extending laterally across the guard housing in a direction orthogonal to the engagement slot.

Various embodiments provide a method of manufacturing a finger guard assembly that include providing a finger guard component including a shroud portion and an engagement arm extending from the shroud portion. The engagement arm includes a first lateral locking tab extending from a first side of the engagement arm and a second lateral locking tab extending from a second side of the engagement arm. The second side is opposite the first side. The method further includes compressing the first lateral locking tab toward the second lateral locking tab and compressing the second lateral locking tab toward the first lateral locking tab. The method also includes inserting the engagement arm of the finger guard component into an opening in a finger guard housing having a plurality of housing walls. At least one of the housing walls in the plurality of housing walls includes the opening. The plurality of housing walls forms an engagement slot extending from the opening into the finger guard housing. The engagement arm is inserted into the opening such that the engagement arm is positioned in the engagement slot and thereby slidably coupled to the finger guard housing so that a distance between the shroud portion and the plurality of housing walls is variable.

In particular embodiments, the method includes coupling the finger guard housing to a measuring tape. The finger guard housing may be coupled to the measuring tape by a hook and loop type fastener such as VELCRO. In particular embodiments, compressing includes compressing the first lateral locking tab toward the second lateral locking tab, and vice versa, such that the first lateral locking tab is separated from the second lateral locking tab by a distance that is narrower than a lateral width of the opening.

Particular embodiments provide a finger guard assembly that includes a measuring tape and a finger guard assembly removably coupled to the measuring tape. The finger guard assembly includes a finger guard housing having a plurality of housing walls. At least one of the housing walls in the plurality of housing walls includes an opening. The plurality of housing walls forms an engagement slot extending from the opening into the finger guard housing. The finger guard assembly also includes a finger guard component including a shroud portion and an engagement arm extending from the shroud portion. The engagement arm is positioned in the engagement slot and thereby slidably coupled to the finger guard housing so that a distance between the shroud portion and the plurality of housing walls is variable.

In particular embodiments, the finger guard assembly is removably coupled to the measuring tape via a hook and loop type fastener such as VELCRO coupling. The shroud includes a curved face, in accordance with particular embodiments. The engagement arm may include a first lateral locking tab extending from a first side of the engagement arm and a second lateral locking tab extending from a second side of the engagement arm. The second side is opposite the first side. In particular embodiments, the first lateral locking tab extends from a first flexure of the engagement arm positioned on the first side and the second lateral locking tab extends from a second flexure of the engagement arm positioned on the second side. The engagement arm includes a first slot spacing the first flexure from a portion of the engagement arm and a second slot spacing the second flexure from a portion of the engagement arm, in accordance with particular embodiments.

It should be appreciated that all combinations of the foregoing concepts and additional concepts discussed in greater detail below (provided such concepts are not mutually inconsistent) are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive finger guard assemblies, systems, and methods of manufacturing and implementing finger guard assemblies. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1A:
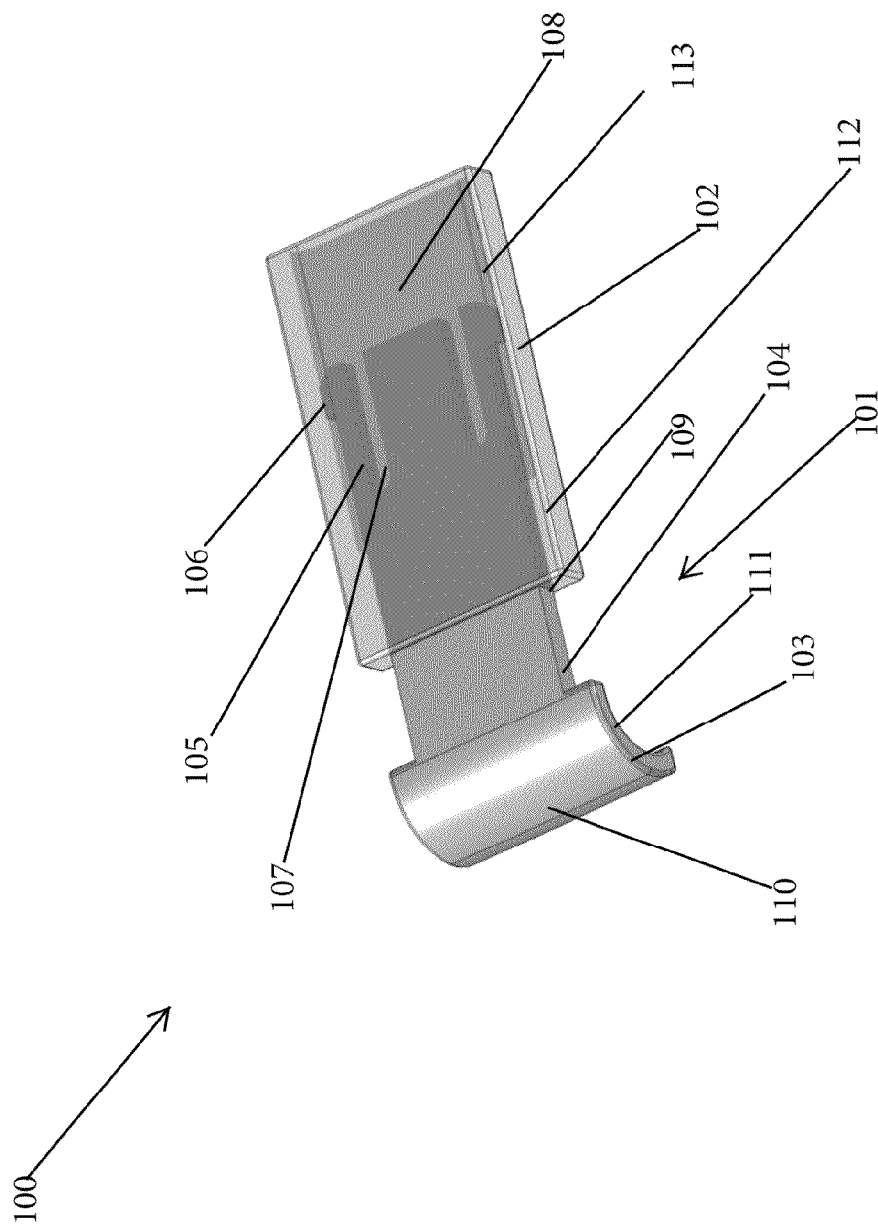
FIG. 1A is a top perspective view of a finger guard assembly, in accordance with example embodiments.
Figure 1B:
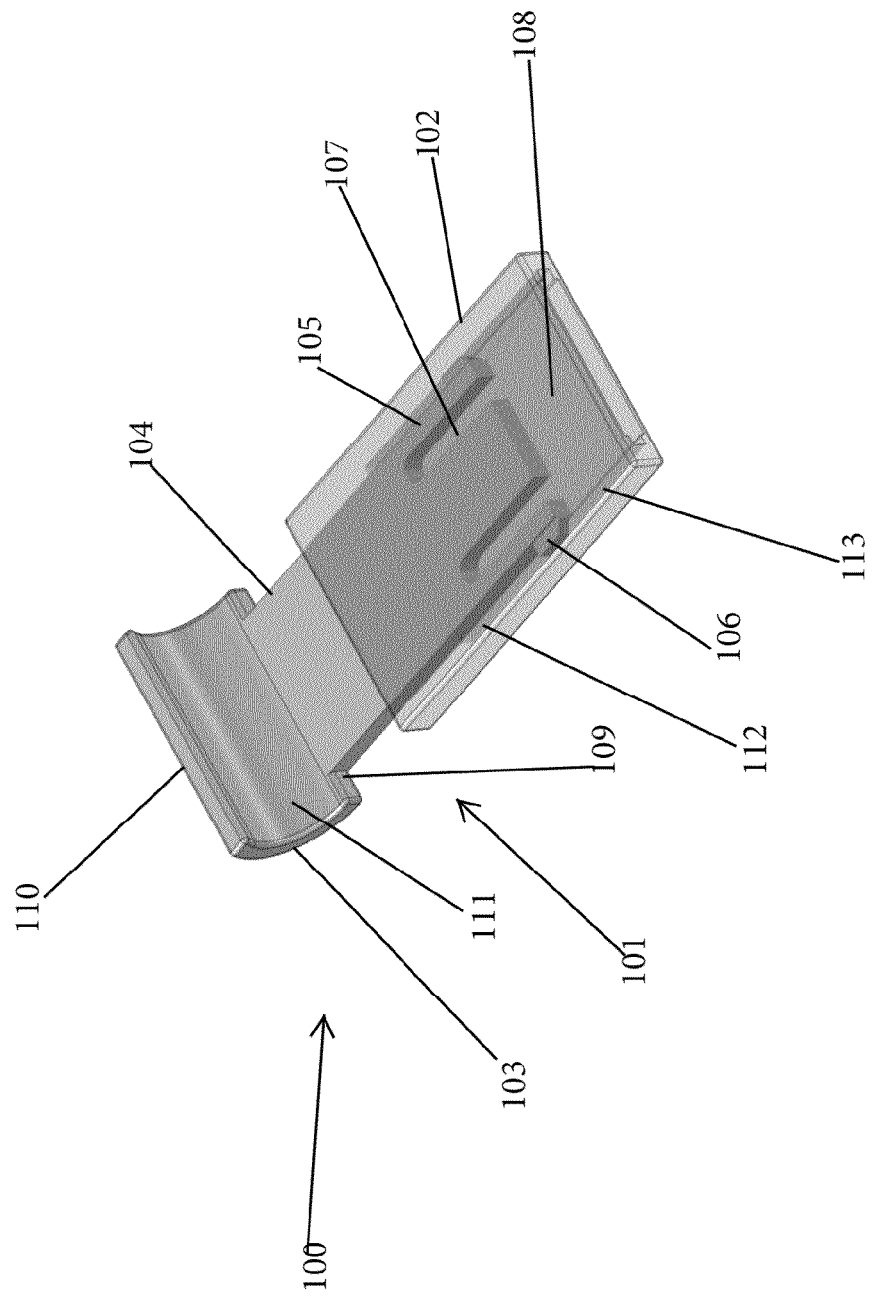
FIG. 1B is a bottom perspective view of the finger guard assembly of FIG. 1A.

FIG. 1A is a top perspective view of a finger guard assembly, in accordance with example embodiments, and FIG. 1B is a bottom perspective view of the finger guard assembly of FIG. 1A. Finger guard assembly 100 includes a finger guard component 101 slidably positioned in a finger guard housing 102. The finger guard component 101 includes a shroud portion 103 and an engagement arm 104 extending from the shroud portion 103. As discussed further herein, the shroud portion 103 shields the finger from abrasion and cuts. The shroud portion 103 may include a curved face 110 and a curved back 111 positioned on an opposite side of the shroud face. The shroud portion 103 may also be tapered in example embodiments. The shroud portion 103 may be composed of a plastic material, which may include plastics configured for low friction sliding, such as polyoxymethylene, so that the shroud portion 103 readily slides across sheetrock, for example, as a measurement is being marked and/or the sheet rock is being cut. In example embodiments the shroud portion 103 may include a lip or edge extending from a lower edge of the shroud portion 103 in a direction away from the engagement arm 104 (e.g. under the surface of the material being cut or marked). The lip or edge helps prevent the shroud portion 103 of the finger guard assembly 100 from slipping off of the edge of the material being cut or marked, for example in a direction orthogonal to an upper plane of the material being cut or marked. The engagement arm 104 is configured for receipt within slot 109 of the finger guard housing 102 via insertion at opening 109 of the slot 108. The engagement arm facilitates changing the position of the shroud portion 103 (for example to move it with respect to a tape measure coupled thereto). The engagement arm 104 may be composed of the same material as the shroud portion 103. The engagement arm 104 includes flexures 105 positioned on opposite sides laterally of the engagement arm 104. The engagement arm 104 includes locking tabs 106 extending laterally from the flexures 105. The flexures 105 are formed via relief slots 107 formed in the engagement arm 104. The relief slot 107 allows the flexures 105 to compress laterally inward to reduce the lateral distance between the locking tabs 106 to permit the engagement arm 104 to be introduced into the slot 108 of the finger guard housing 102.

The slot 108 of the finger guard housing 102 may include distinct lateral dimensions, including a narrower entry region 112 and a wider rear region 113. The wider rear region 113 permits expansion of the flexure arms and engagement tabs. The narrower entry region 112 prevents the engagement arm 104 from unintentionally disengaging from the finger guard housing 102 once expanded, because entry region 112 is narrower than the width of the expanded flexures 105 and locking tabs 106 disposed on the flexures 105. The relief slots 107 may have a longitudinal length that is longer than the length of the entry region 112 to permit compression of the flexures 105 and reduce the width between the locking tabs 106 to width that is less than the width of the entry region 112. Once the width between the locking tabs 106 is reduced by compression of the engagement arm 104 and the flexures 105, the locking tabs 106 fit within the entry region 112 and permit the finger guard component 101 to be slidably removed from the finger guard housing 102.

Figure 2:
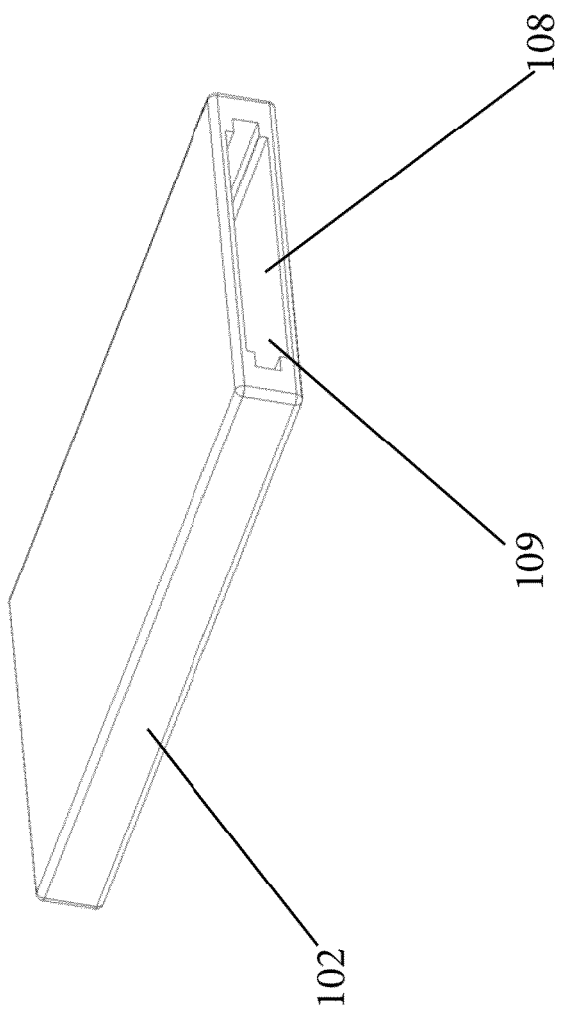
FIG. 2 shows the housing of FIG. 1 with the finger guard component evacuated therefrom.

FIG. 2 shows the housing of FIG. 1 with the finger guard component evacuated therefrom. The finger guard housing 102 includes a plurality of housing walls that form the engagement slot 108. At least one of the housing walls includes the opening 109. The opening 109 may include alignment slots 114, such that the opening 109 has a profile corresponding to the engagement arm 104 and the locking tabs 106 extending therefrom. The width between the alignment slots 114, which are positioned in the entry region 112 of the engagement slot 108, is narrower than the width between the locking tabs 106 in their neutral state or unflexed state. The finger guard housing 102 may be composed of materials, including, but not limited to plastic in accordance with example embodiments.

Figure 3:
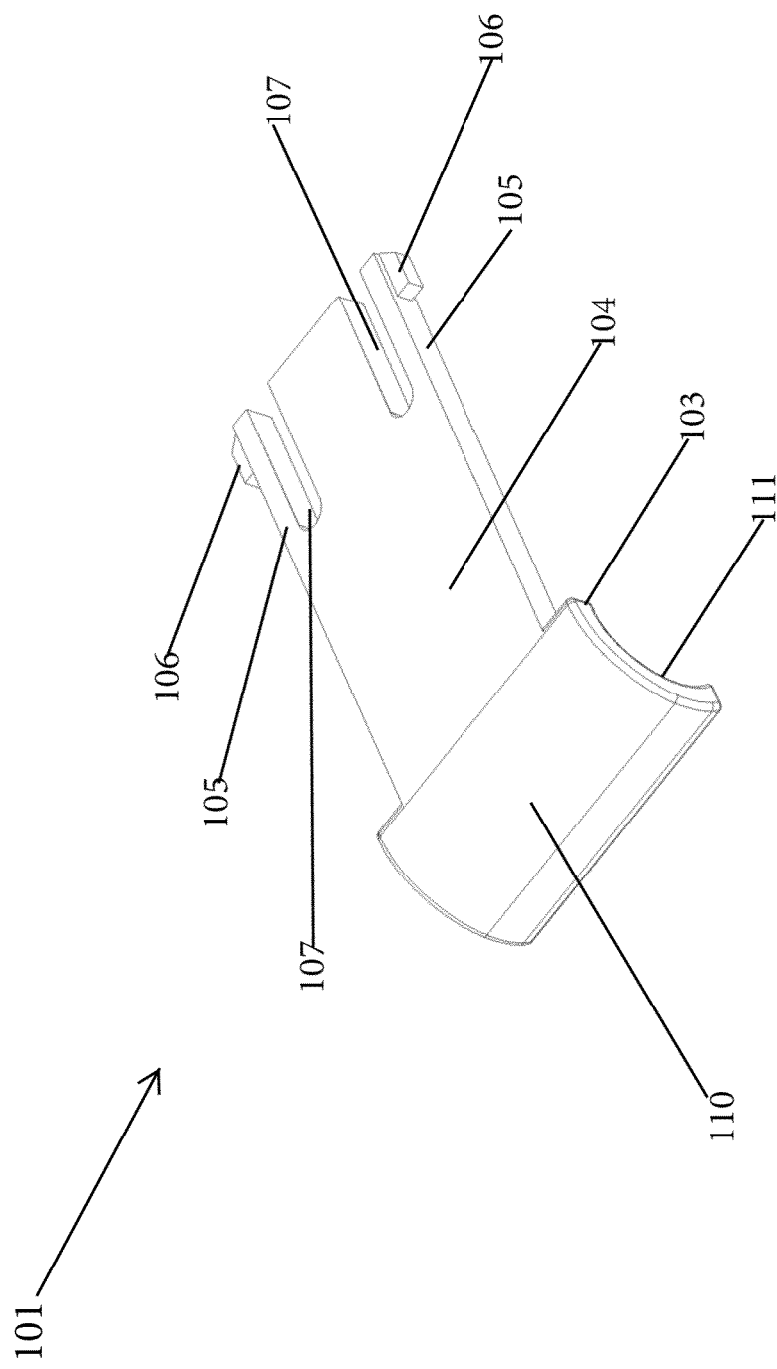
FIG. 3 illustrates the finger guard component of the finger guard assembly of Figure one separated from the finger guard housing.

FIG. 3 illustrates the finger guard component of the finger guard assembly of Figure one separated from the finger guard housing.

Figure 4:
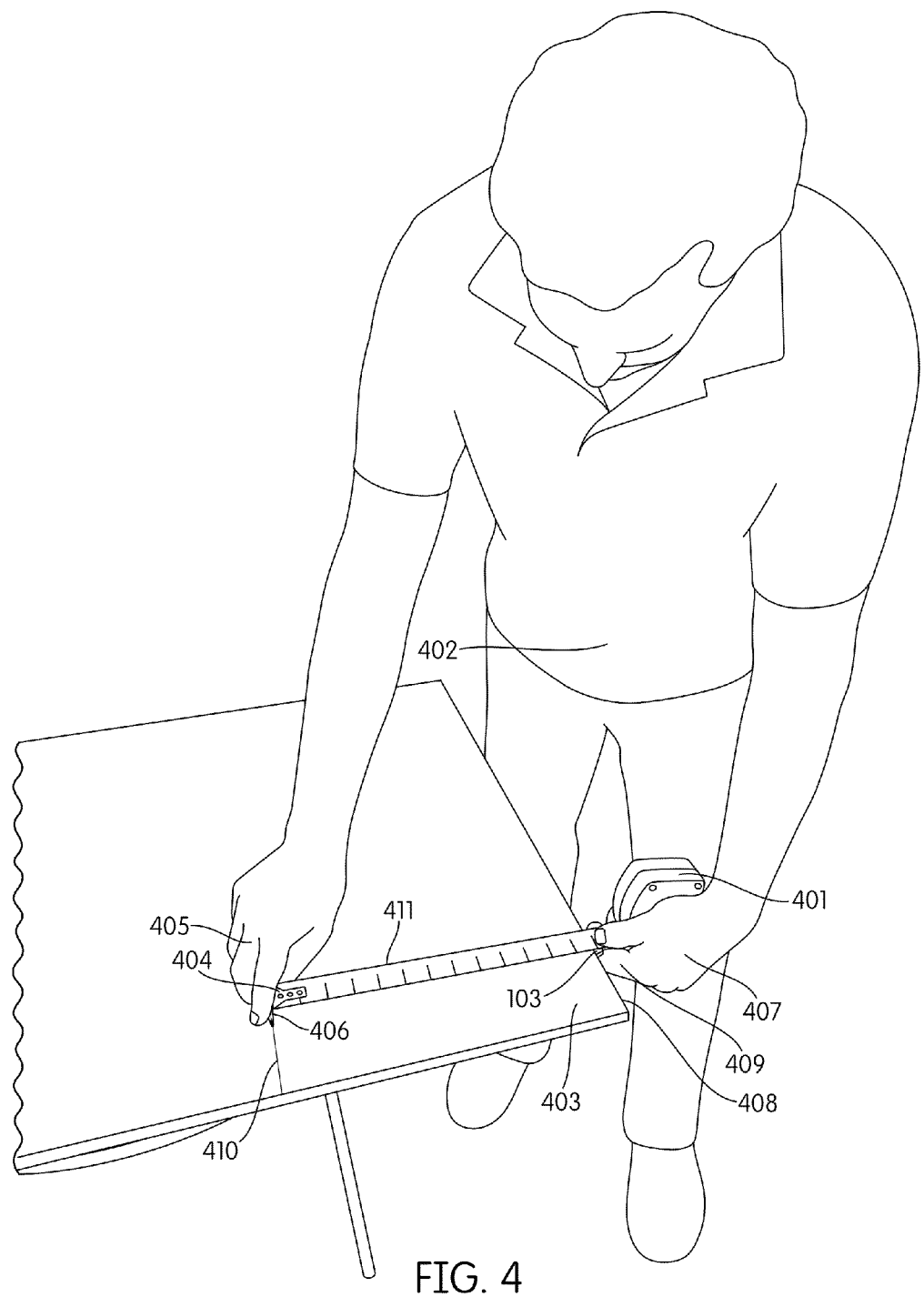
FIG. 4 illustrates the finger guard assembly of FIG. 1 in a finger guarding implementation, in accordance with example embodiments.

FIG. 4 illustrates the finger guard assembly of FIG. 1 in a finger guarding implementation, in accordance with example embodiments. As shown in FIG. 4, the finger guard assembly 100 may be implemented with a tape measure 401. A top surface of the figurer guard housing 102 may be coupled to a bottom surface of the tape measure 401, for example via a hook and loop type fastener such as VELCRO. A drywall installer 402 extends the tape 411 of the tape measure 401 to a desired length to mark and/or cut the drywall sheet 403. The front extended end 404 of the tape measure 401 is held by a first-hand 405 of the installer 402. The first hand 405 also holds marking tool 406. Finger 409 of a second hand 407 of the installer 402 helps pinch the tape 411 of the tape measure 401 at the edge 408 of the drywall sheet 403 to keep the tape 411 at the extended position. Finger 409 pinches the tape 411 against the engagement arm 104 and/or the shroud portion 103 of the finger guard assembly 100. Accordingly, as the drywall installer 402 slides the tape 411 of the tape measure 401 and the marking device 406 along the surface of the drywall sheet 403, the installer 402 marks the drywall sheet 403 with a measured line 410. As the tape 411 of the tape measure 401 slides along the drywall sheet 403 to mark the measured line 410 (or cut if a cutting device is exchanged for marking device 406), finger 409 slides along the edge 408 of the drywall sheet 403. The shroud portion 103 guards finger 409 from abrasion from the edge 408 of the drywall sheet 403 during sliding along the edge 408. The shroud portion 103 also facilitating sliding along the edge 408.

Figure 5:
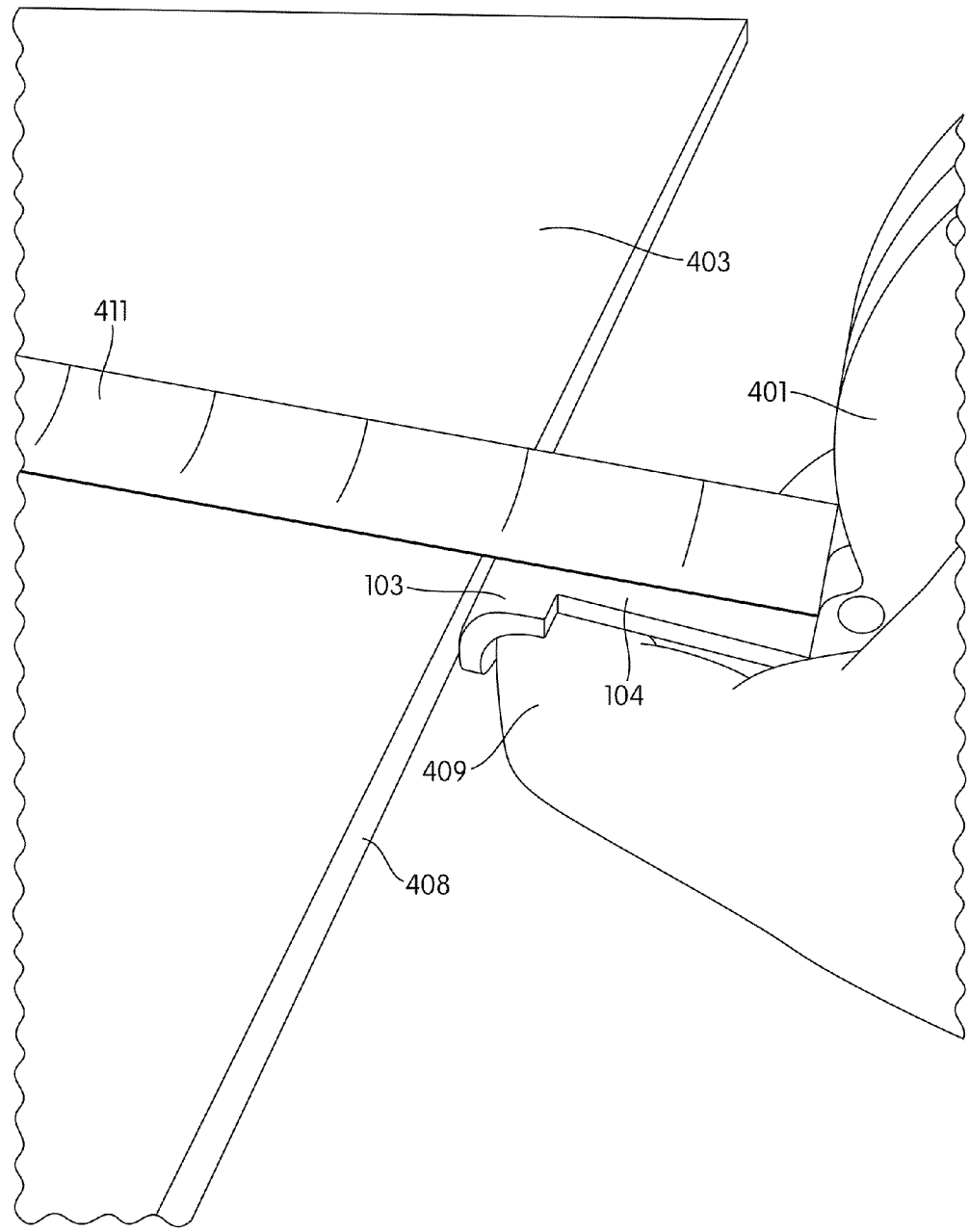
FIG. 5 illustrates a magnified view of the finger guard assembly implemented with a tape measure, in accordance with example embodiments.

FIG. 5 illustrates a magnified view of the finger guard assembly implemented with a tape measure, in accordance with example embodiments. The shroud portion 103 protects finger 409 from abrasion as the tape 411, pinched against the engagement arm 104 and/or the shroud portion 103 of the finger guard assembly 100 is held at a desired extended length to facilitate marking and/or cutting the drywall sheet 403 at a desired measurement.

Figure 6A:
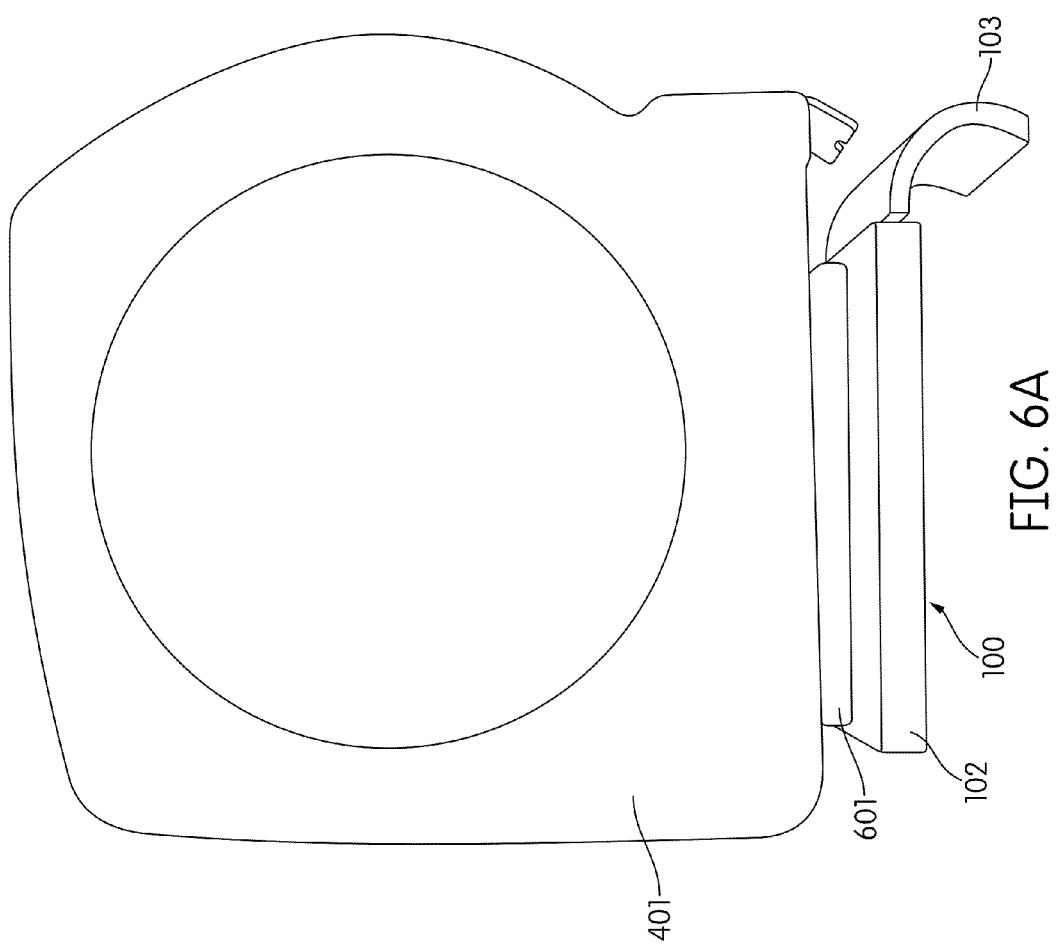
FIGS. 6A-6D illustrate a finger guard assembly coupled to a tape measure, in accordance with example embodiments.

FIGS. 6A-6D illustrate the finger guard assembly coupled to a tape measure, in accordance with example embodiments. FIG. 6A shows the finger guard assembly 100 coupled to the bottom of tape measure 401. In the illustrated embodiment the finger guard housing 102 is removably coupled to the bottom of the tape measure 401 via a hook and loop type fastener such as VELCRO coupling 601. The engagement arm 104 is recessed within the finger guard housing 102 such that the shroud portion 103 is adjacent to the finger guard housing 102. In example embodiments, the finger guard housing 102 may be coupled to the tape measure 401 via various coupling mechanisms and/or components. In example embodiments, the finger guard assembly 100 may be integrally formed with the tape measure 401.

Figure 6B:
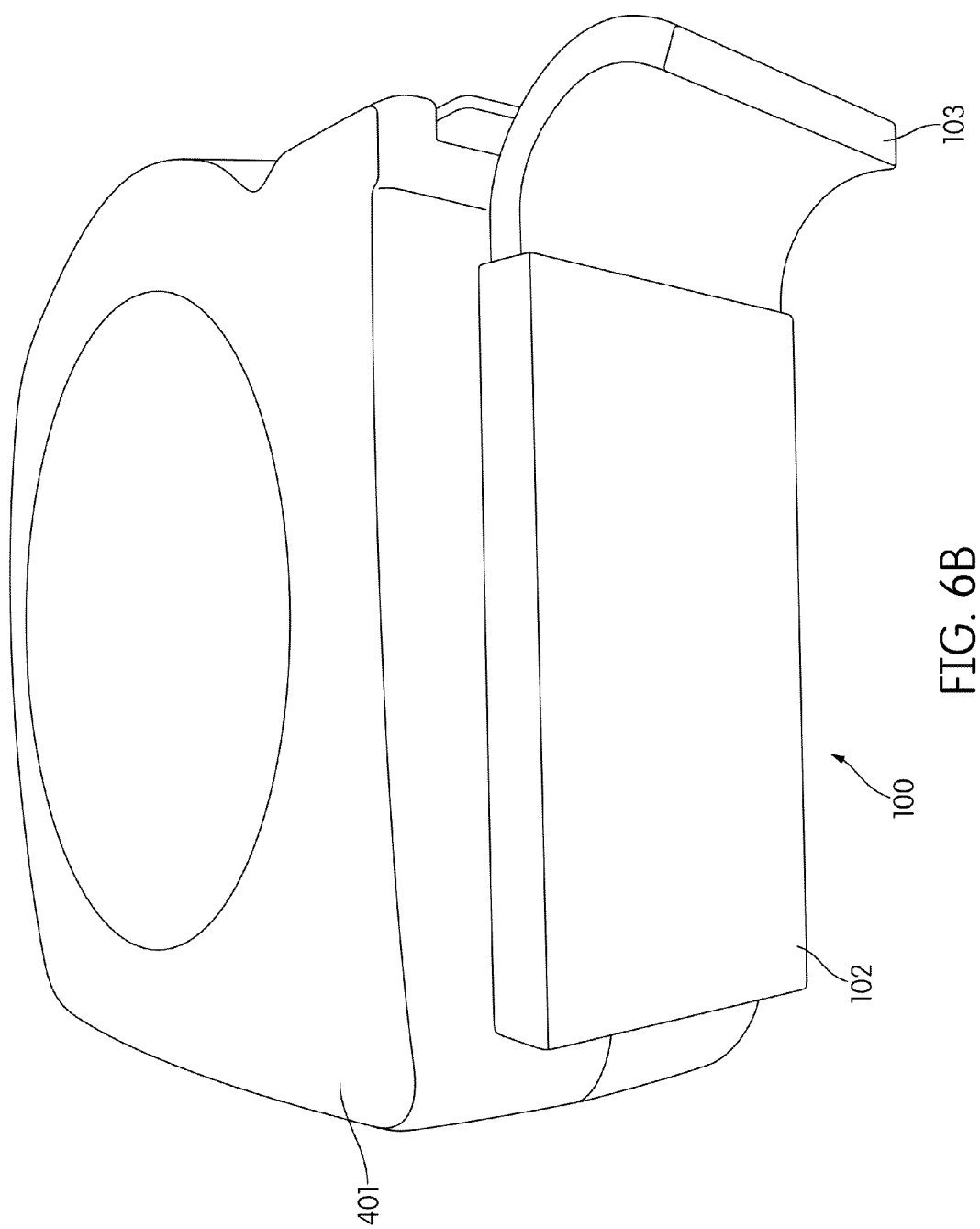
Figure 6C:
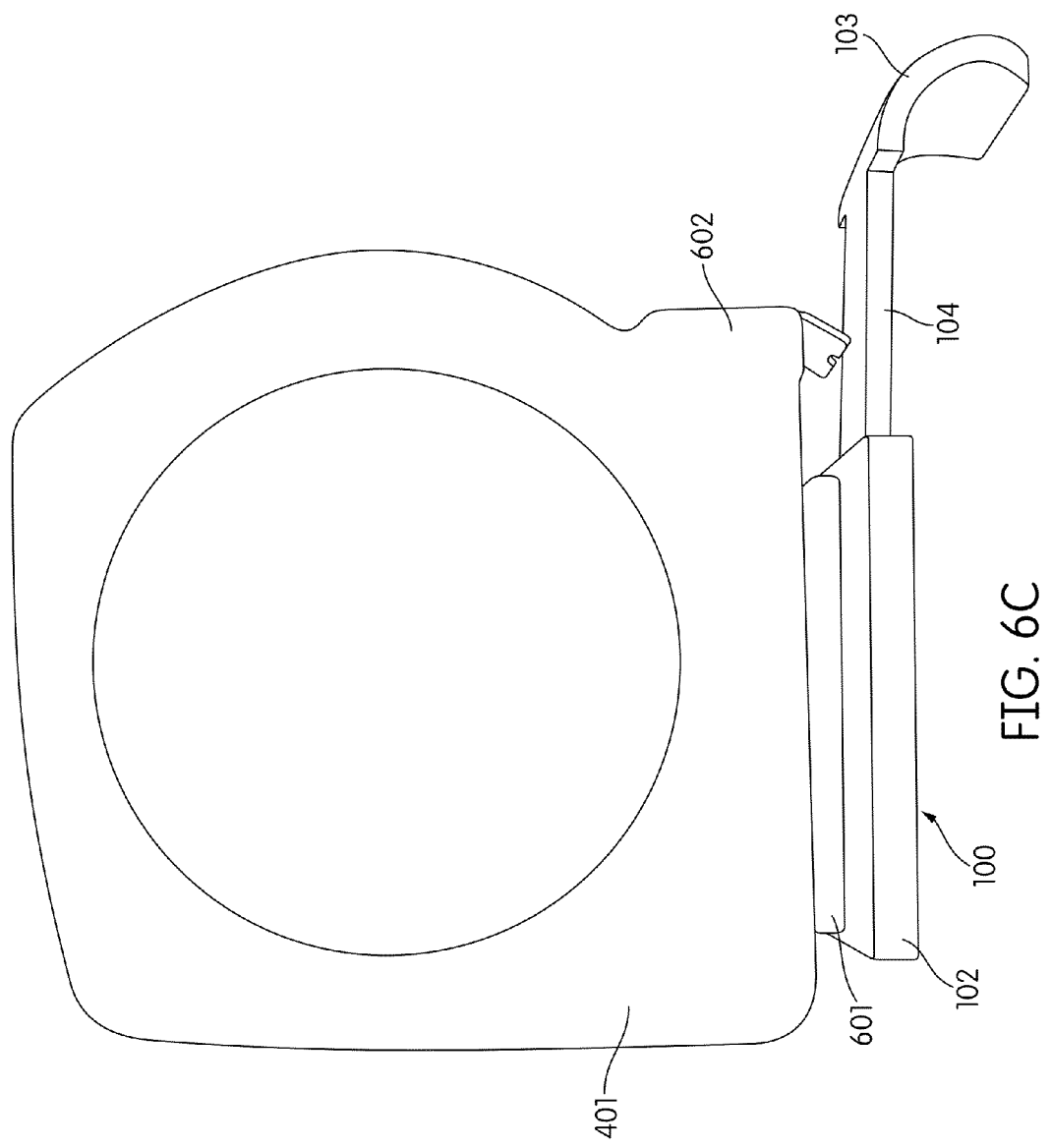
Figure 6D:
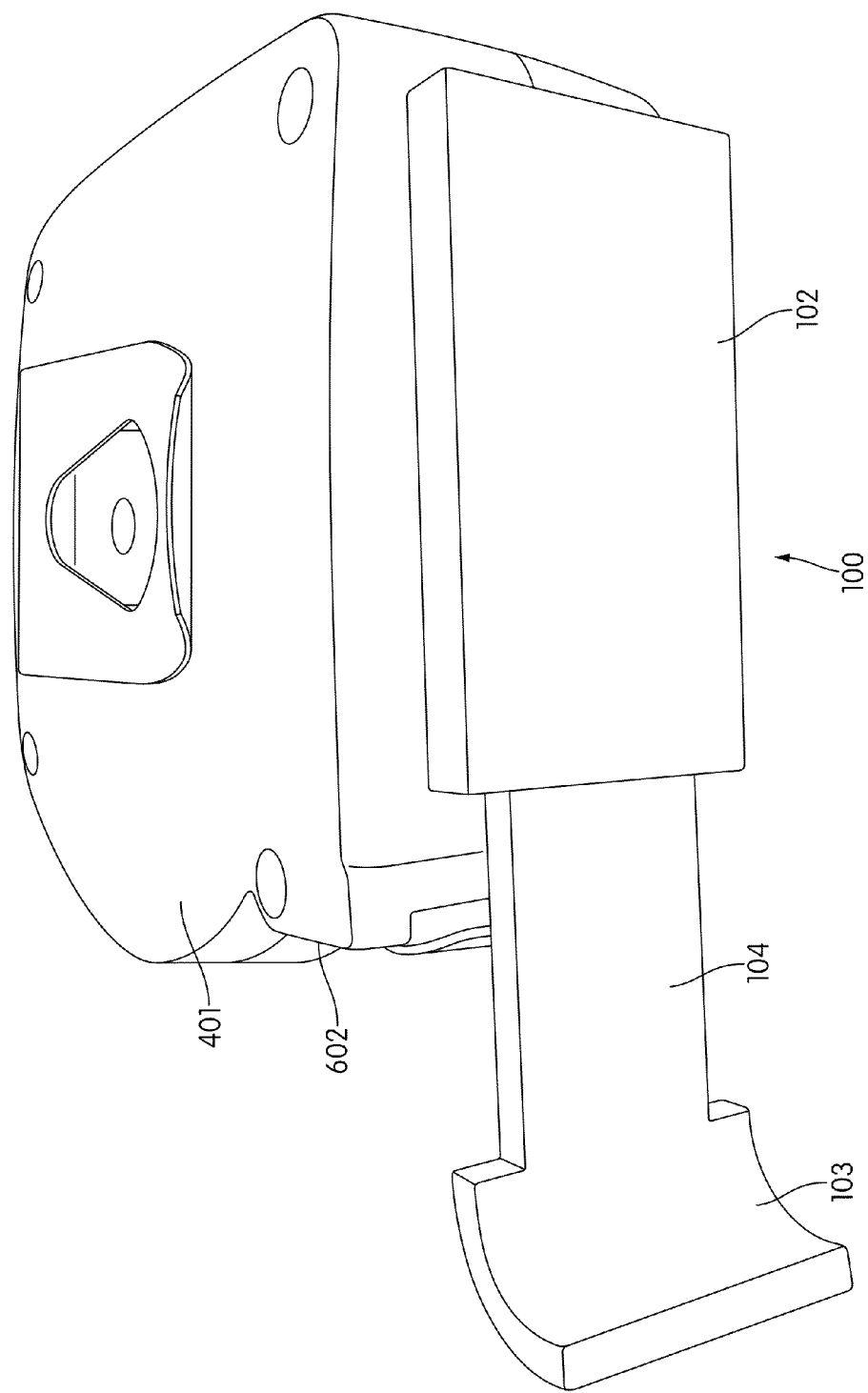

FIG. 6B provides a bottom perspective view of the finger guard assembly 100 coupled to the bottom of tape measure 401. FIG. 6C provides a side view of the finger guard assembly 100 coupled to the bottom of tape measure 401 with the engagement arm 104 in an extended position such that the shroud portion 103 is moved away from the finger guard housing 102 and extends pass a front edge 602 of the tape measure 401. FIG. 6D provides a bottom perspective view of the finger guard assembly 100 coupled to the bottom of tape measure 401 with the engagement arm 104 in an extended position As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described are considered to be within the scope of the disclosure.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A finger guard assembly comprising:
    a finger guard housing having a plurality of housing walls, at least one of the housing walls in the plurality of housing walls including an opening, the plurality of housing walls forming an engagement slot extending from the opening into the finger guard housing;
    a finger guard component including a shroud portion and an engagement arm extending from the shroud portion, the engagement arm positioned in the engagement slot and thereby slidably coupled to the finger guard housing so that a distance between the shroud portion and the plurality of housing walls is variable; and
    wherein the engagement arm includes a first lateral locking tab extending from a first side of the engagement arm and a second lateral locking tab extending from a second side of the engagement arm, the second sided opposite the first side.

2. The finger guard assembly of claim 1, wherein the shroud portion includes a curved face.

3. The finger guard assembly of claim 2, wherein the shroud portion includes a curved back positioned opposite the curved face.

4. The finger guard assembly of claim 1, wherein the first lateral locking tab extends from a first flexure of the engagement arm positioned on the first side and the second lateral locking tab extends from a second flexure of the engagement arm positioned on the second side.

5. The finger guard assembly of claim 4, wherein the engagement arm includes a first slot spacing the first flexure from a portion of the engagement arm and a second slot spacing the second flexure from the portion of the engagement arm.

6. The finger guard assembly of claim 5, wherein the portion is positioned between the first lateral locking tab and the second lateral locking tab.

7. The finger guard assembly of claim 5, wherein a lateral distance between the first locking tab and the second locking tab is wider than a lateral width of the opening.

8. The finger guard assembly of claim 5, wherein the housing includes a curved recess extending laterally across the guard housing in a direction orthogonal to the engagement slot.

9. A method of manufacturing a finger guard assembly comprising:
    providing a finger guard component including a shroud portion and an engagement arm extending from the shroud portion, the engagement arm including a first lateral locking tab extending from a first side of the engagement arm and a second lateral locking tab extending from a second side of the engagement arm, the second side opposite the first side;
    compressing the first lateral locking tab toward the second lateral locking tab, and vice versa; and
    inserting the engagement arm of the finger guard component into an opening in a finger guard housing having a plurality of housing walls, at least one of the housing walls in the plurality of housing walls including the opening, the plurality of housing walls forming an engagement slot extending from the opening into the finger guard housing, the engagement arm inserted into the opening such that the engagement arm is positioned in the engagement slot and thereby slidably coupled to the finger guard housing so that a distance between the shroud portion and the plurality of housing walls is variable.

10. The method of claim 9, further comprising coupling the finger guard housing to a measuring tape.

11. The method of claim 9, wherein coupling includes attaching the finger guard housing to the tape measurer via Velcro.

12. The method of claim 9, wherein compressing comprises compressing the first lateral locking tab toward the second lateral locking tab, and vice versa, such that the first lateral locking tab is separated from the second lateral locking tab by a distance that is narrower than a lateral width of the opening.

13. A finger guard assembly, comprising:
a measuring tape; and
a finger guard assembly removably coupled to the measuring tape, the finger guard assembly including:
a finger guard housing having a plurality of housing walls, at least one of the housing walls in the plurality of housing walls including an opening, the plurality of housing walls forming an engagement slot extending from the opening into the finger guard housing,
a finger guard component including a shroud portion and an engagement arm extending from the shroud portion, the engagement arm positioned in the engagement slot and thereby slidably coupled to the finger guard housing so that a distance between the shroud portion and the plurality of housing walls is variable;
and wherein the engagement arm includes a first lateral locking tab extending from a first side of the engagement arm and a second lateral locking tab extending from a second side of the engagement arm, the second sided opposite the first side.

14. The finger guard assembly of claim 13, wherein the finger guard assembly is removably coupled to the measuring tape via a Velcro coupling.

15. The finger guard assembly of claim 13, wherein the shroud portion includes a curved face.

16. The finger guard assembly of claim 13, wherein the first lateral locking tab extends from a first flexure of the engagement arm positioned on the first side and the second lateral locking tab extends from a second flexure of the engagement arm positioned on the second side.

17. The finger guard assembly of claim 16, wherein the engagement arm includes a first slot spacing the first flexure from a portion of the engagement arm and a second slot spacing the second flexure from the portion of the engagement arm.

* * * * *